(12) United States Patent
Lo et al.

(10) Patent No.: US 9,395,858 B2
(45) Date of Patent: Jul. 19, 2016

(54) CAPACITIVE FINGER NAVIGATION DEVICE WITH HYBRID MODE AND OPERATING METHOD THEREOF

(71) Applicant: PIXART IMAGING INC., Hsin-Chu County (TW)

(72) Inventors: Chung-Wen Lo, Hsin-Chu County (TW); Tom Murphy, Hsin-Chu County (TW); Hsin-Chia Chen, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 83 days.

(21) Appl. No.: 14/337,325

(22) Filed: Jul. 22, 2014

(65) Prior Publication Data

US 2016/0026283 A1  Jan. 28, 2016

(51) Int. Cl.
| | | |
|---|---|---|
| *G06F 3/045* | (2006.01) | |
| *G06F 3/044* | (2006.01) | |
| *G06F 3/041* | (2006.01) | |

(52) U.S. Cl.
CPC .............. *G06F 3/044* (2013.01); *G06F 3/0412* (2013.01)

(58) Field of Classification Search
CPC ................................ G06F 3/044; G06F 3/0412
USPC ........................................ 345/174; 178/18.06
See application file for complete search history.

(56) References Cited

U.S. PATENT DOCUMENTS

| | | | | |
|---|---|---|---|---|
| 2003/0071784 A1* | 4/2003 | Sato | ......................... | G06F 3/044 345/156 |
| 2007/0132724 A1* | 6/2007 | Muranaka | ............ | G06F 3/03547 345/156 |
| 2007/0273659 A1* | 11/2007 | XiaoPing | ................ | G06F 3/044 345/173 |
| 2007/0291013 A1* | 12/2007 | Won | ........................ | G06F 3/044 345/173 |
| 2008/0001926 A1* | 1/2008 | XiaoPing | ................ | G06F 3/044 345/173 |
| 2008/0143681 A1* | 6/2008 | XiaoPing | ................ | G06F 3/044 345/173 |
| 2008/0191715 A1* | 8/2008 | Schediwy | ............... | G06F 3/044 324/663 |
| 2009/0141046 A1* | 6/2009 | Rathnam | ................. | G06F 3/044 345/156 |
| 2009/0229892 A1* | 9/2009 | Fisher | ..................... | G06F 3/044 178/18.03 |
| 2009/0266622 A1* | 10/2009 | Yoshikawa | .............. | G06F 3/044 178/18.01 |
| 2010/0058251 A1* | 3/2010 | Rottler | ................ | G06F 3/04845 715/863 |
| 2011/0248954 A1* | 10/2011 | Hamada | .................. | G06F 3/044 345/174 |
| 2015/0042585 A1* | 2/2015 | Lin | ......................... | G06F 3/041 345/173 |

* cited by examiner

*Primary Examiner* — Adam J Snyder
(74) *Attorney, Agent, or Firm* — Rosenberg, Klein & Lee (57) ABSTRACT

There is provided an operating method of a capacitive finger navigation device including the steps of: calculating a touch coordinate according to a predetermined position coordinate and associated detected variation of each of a plurality of detecting cells when the associated detected variations of the detecting cells exceed a threshold; mapping the touch coordinate to a touch position associated with a touch surface; entering a relative motion mode when the touch position is in a first area; and entering an absolute coordinate mode when the touch position is in a second area.

21 Claims, 6 Drawing Sheets

– – – sense line
——— drive line

CAPACITIVE FINGER NAVIGATION DEVICE WITH HYBRID MODE AND OPERATING METHOD THEREOF

BACKGROUND

1. Field of the Disclosure

This disclosure generally relates to an input device and, more particularly, to a capacitive finger navigation device with hybrid mode and operating method thereof.

2. Description of the Related Art

Conventional desktop computers or notebook computers need to be operated in cooperation with various computer peripheral devices which are served as the interactive interface between the user and the computer system. For example, a user may input information through a keyboard or control a cursor motion through a mouse device. As the conventional computer system has a large size and is generally operated in a state of being putted at a fixed location, peripheral devices having a large size are acceptable to the user.

However, as the computer system is developed toward the trend of compactness and miniaturization, e.g. portable devices all belonging to the electronic device employing a computer system, the computer peripheral devices also need to be improved accompanying with the change of the computer system. The conventional peripheral devices having a large size such as the keyboard and the desktop mouse are no longer suitable for next-generation portable devices.

SUMMARY

Accordingly, the present disclosure further provides a capacitive finger navigation device with hybrid mode and operating method thereof adapted to portable electronic devices.

The present disclosure provides a capacitive finger navigation device with hybrid mode and operating method thereof that have operating functions of both the mouse device and the joystick device.

The present disclosure further provides a capacitive finger navigation device with hybrid mode and operating method thereof that further include a non-output mode or a click mode thereby increasing the practicality thereof.

The present disclosure provides a finger navigation device including a capacitive touch device and a processing unit. The capacitive touch device includes a touch surface and a plurality of detecting cells. The touch surface is configured as an operating interface. The plurality of detecting cells is configured to respectively output a capacitance variation signal. The processing unit is configured to calculate a touch position corresponding to the touch surface according to the capacitance variation signals and predetermined position coordinates of the detecting cells to accordingly enter a relative motion mode or an absolute coordinate mode.

The present disclosure further provides an operating method of a finger navigation device. The finger navigation device includes a touch surface and a plurality of detecting cells. The operating method includes the steps of: calculating a touch coordinate according to a predetermined position coordinate and associated detected variation of each of the detecting cells when the detected variations of the detecting cells exceed a threshold; mapping the touch coordinate to a touch position associated with the touch surface; entering a relative motion mode when the touch position is in a first area; and entering an absolute coordinate mode when the touch position is in a second area.

The present disclosure further provides a capacitive navigation device including a curved touch surface and a processing unit. The curved touch surface is configured as an operating interface. The processing unit is configured to determine a first area and a second area corresponding to the curved touch surface, to enter a mouse mode when identifying a touch position in the first area and to enter a joystick mode when identifying the touch position in the second area.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
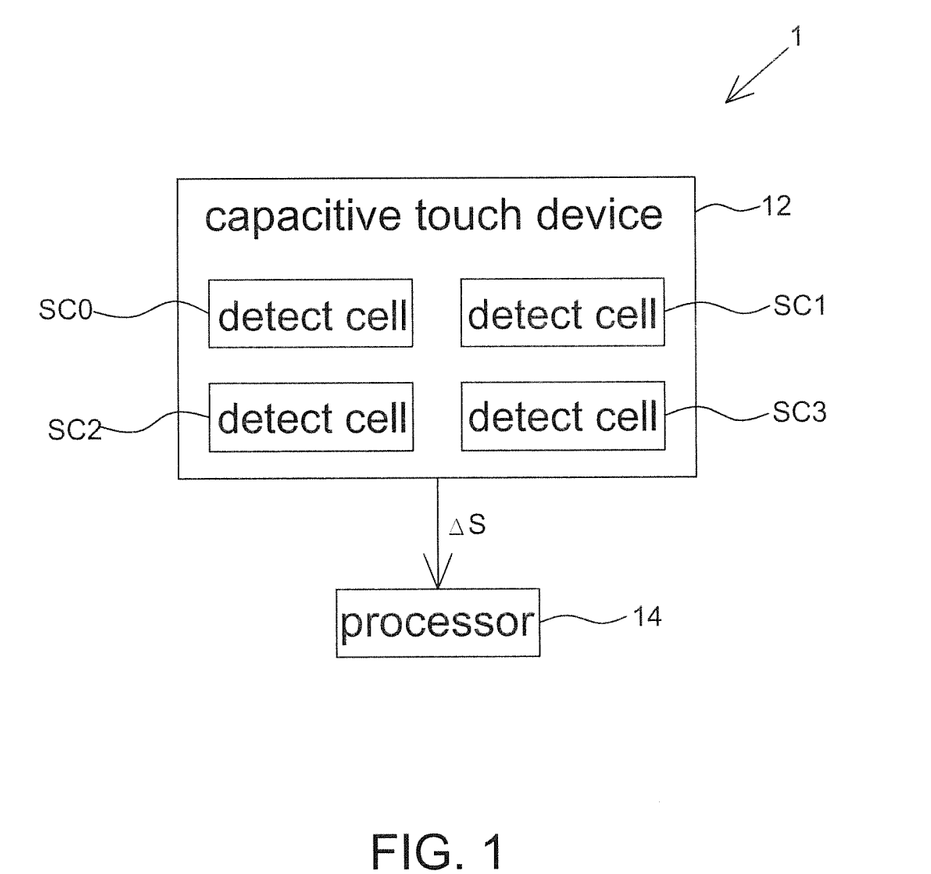
FIG. 1 is a schematic block diagram of the capacitive finger navigation device according to one embodiment of the present disclosure.

Referring to FIG. 1, it is a schematic block diagram of the capacitive finger navigation device 1 according to one embodiment of the present disclosure. The capacitive finger navigation device 1 operates in a mouse mode (or referred to relative motion mode), a joystick mode (or referred to absolute coordinate mode), a resting mode (or referred to non-output mode) or a click mode according to different touch positions. The capacitive finger navigation device 1 combines detected results of different modes when mode change occurs so as to increase the practicality and operation convenience. In this manner, by using a single navigation device, it is able to achieve functions of at least two peripheral devices at the same time. The capacitive finger navigation device 1 has a small size to be adapted to various portable electronic devices.

The capacitive finger navigation device 1 includes a capacitive touch device 12 and a processing unit 14 electrically connected to each other. The processing unit 14 is, for example, a single chip, a microcontroller, a digital signal processor or a central processor. The processing unit 14 is configured to calculate a touch position, e.g. a touch position of a conductor (e.g. a finger shown herein) corresponding to a touch surface 120 of the capacitive touch device 12, according to the detected variation ΔS outputted by the capacitive touch device 12 and to determine an operating mode according to the touch position.

Figure 2A:
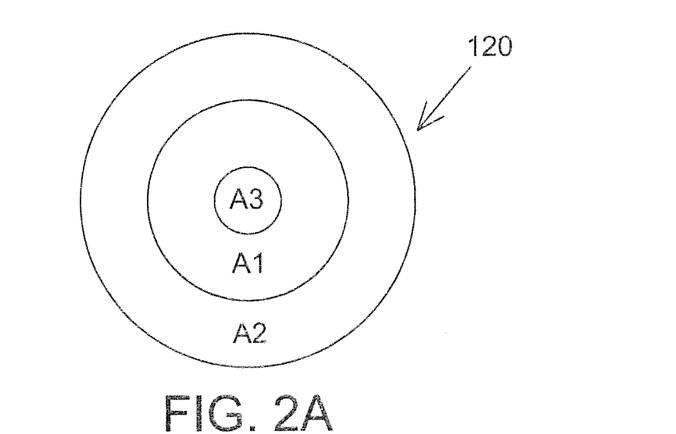
FIG. 2A is an upper view of the arrangement of different mode areas of touch surface according to one embodiment of the present disclosure.
Figure 2B:
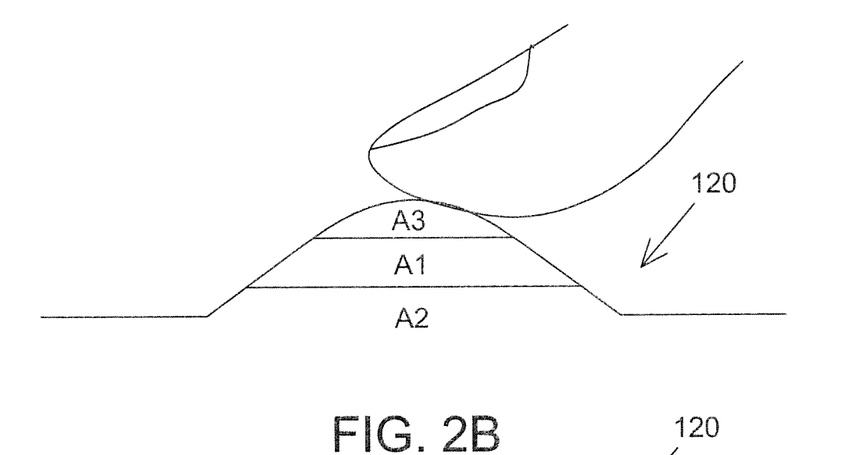
FIGS. 2B-2C are side views of the arrangement of different mode areas of the touch surface according to some embodiments of the present disclosure.
Figure 2C:
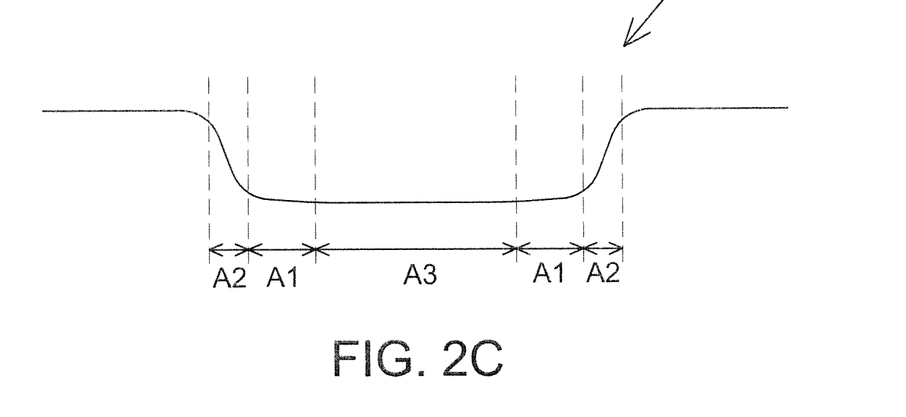

Referring to FIGS. 1 and 2A-2C, the capacitive touch device 12 includes a touch surface 120 and a plurality of detecting cells (e.g. FIG. 1 showing 4 detecting cells SC0 to SC3, but not limited to), wherein FIG. 2A is an upper view of the arrangement of different mode areas of the touch surface 120 according to one embodiment of the present disclosure, and FIGS. 2B-2C are side views of the arrangement of different mode areas of the touch surface 120 according to some embodiments of the present disclosure. The touch surface 120 is configured as an operating interface for a single finger operating thereon, e.g. performing the touch operation, sliding operation, click operation and so on. In this embodiment, as the capacitive finger navigation device 1 is adapted to portable electronic devices, the touch surface 120 is slightly smaller than the surface area of a finger, e.g. 8 mm×8 mm. In addition, in order to allow the finger surface not to simultaneously contact the whole touch surface 120 and different mode areas during operation, the touch surface 120 is preferably formed to have a curved surface, e.g. a dome shape as shown in FIG. 2B or a concave shape as shown in FIG. 2C. It should be mentioned that although FIGS. 2A-2C show 3 mode areas A1 to A3, the present disclosure is not limited thereto. In some embodiments, the touch surface 120 is only divided as two areas, e.g. a first area A1 (including the third area A3 shown in FIGS. 2A-2C) and a second area A2. In other words, the third area A3 is implemented optionally according to different applications. The position and number of the mode areas are determined according to different applications.

Figure 3A:
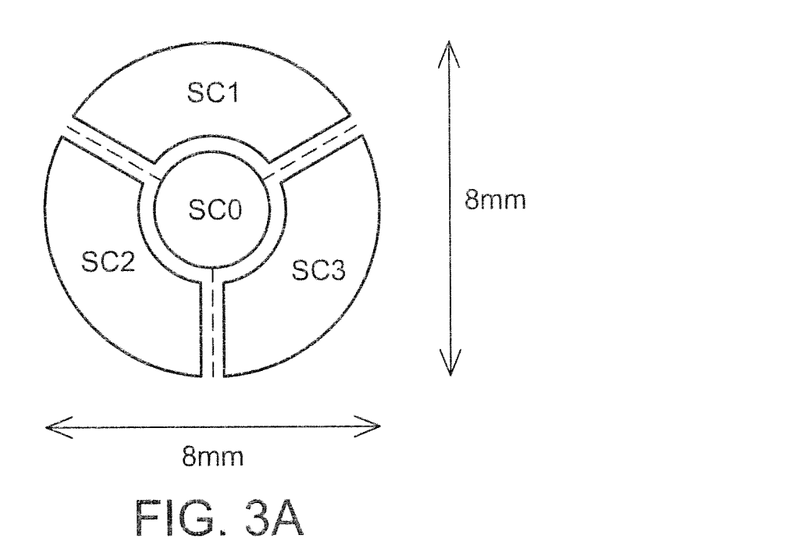
FIG. 3A is a schematic diagram of the arrangement of detecting cells of the capacitive finger navigation device according to one embodiment of the present disclosure.
Figure 3B:
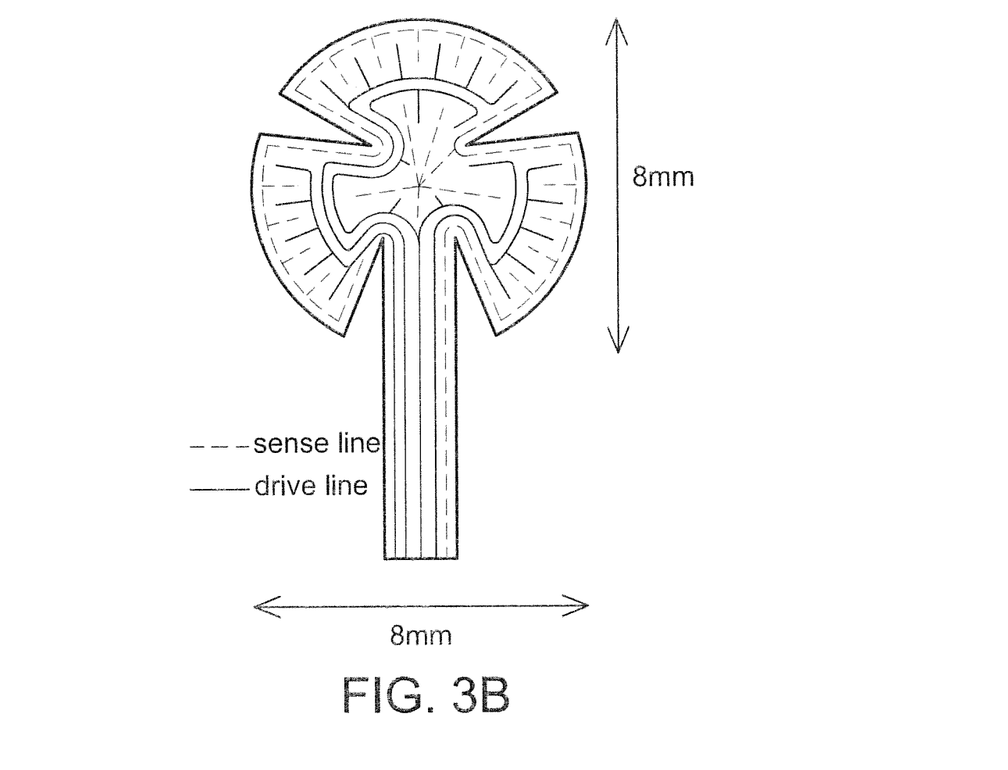
FIG. 3B is a schematic diagram of the arrangement or the driving electrode and the sensing electrode of the capacitive finger navigation device according to one embodiment of the present disclosure.

Referring to FIGS. 3A and 3B, FIG. 3A is a schematic diagram of the arrangement of detecting cells SC0 to SC3 of the capacitive linger navigation device 1 according to one embodiment of the present disclosure, and FIG. 3B is schematic diagram of the arrangement of the driving electrode (or the driving line) and the sensing electrode (or the sensing line) of the capacitive finger navigation device 1 according to one embodiment of the present disclosure. The detecting cells SC0 to SC3 are configured to output a capacitance variation signal respectively, wherein at least one driving electrode and at least one sensing electrode are disposed corresponding to each of the detecting cells SC0 to SC3 configured to form mutual capacitance therebetween, as shown in FIG. 3B for example. When a conductor approaches the detecting cells SC0 to SC3, the mutual capacitance is changed and the detected variation, e.g. a voltage variation or a current variation, is outputted. The technology of one set of capacitors detecting an approaching conductor and outputting the capacitance variation signal is well known and thus details thereof are not described herein. It should be mentioned that, the arrangement of the electrodes shown in FIG. 3B is only intended to illustrate but not to limit the present disclosure. As long as each of the detecting cells SC0 to SC3 is able to output a detected variation corresponding to an approaching conductor, the arrangement and number of the driving electrode and sensing electrode do not have particular limitation.

It is appreciated that, in FIG. 3B the I/O part of the driving and sensing lines (e.g. the vertical part shown in the lower half of the figure) further includes a ground line between the sensing line and the driving line for isolation, FIG. 3B exemplarily shows 4 driving lines corresponding to a number of the detecting cells and 1 sensing line, but the present disclosure is not limited thereto.

Figure 4:
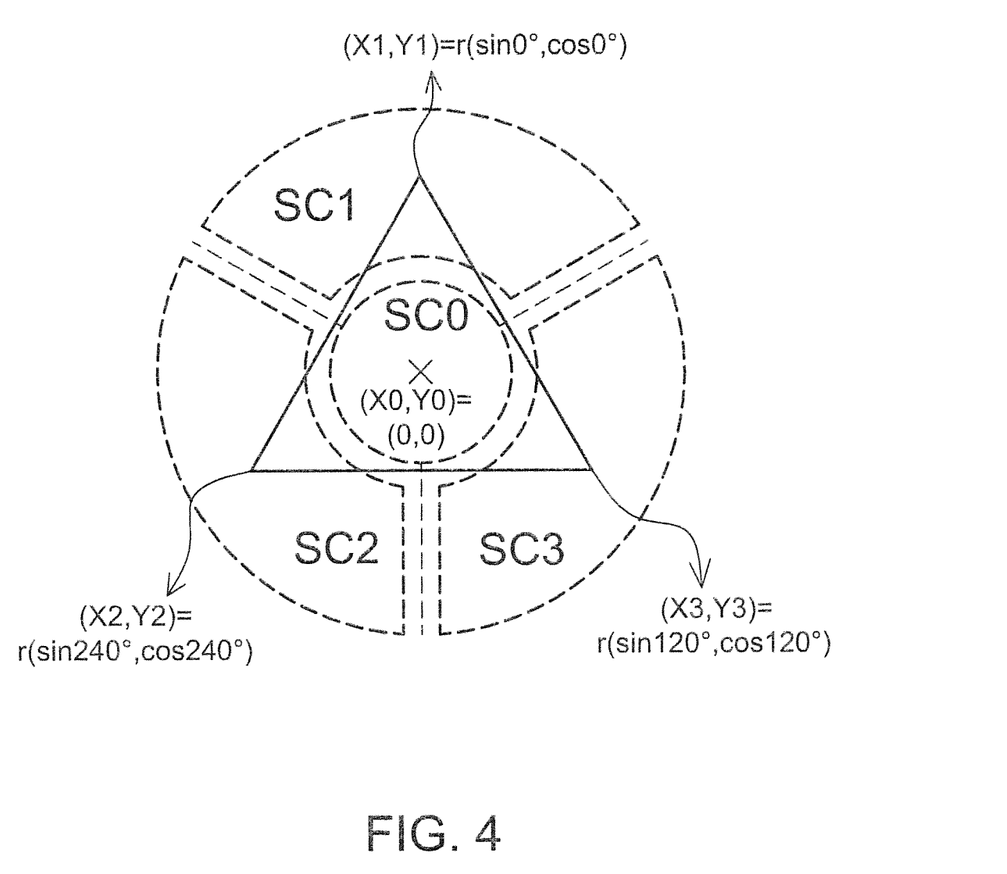
FIG. 4 is a schematic diagram of predetermined position coordinates of the detecting cells of the capacitive finger navigation device according to one embodiment of the present disclosure.

In this embodiment, a predetermined position coordinate is set corresponding to each of the detecting cells SC0 to SC3. For example, FIG. 4 shows that, under the arrangement of the detecting cells SC0 to SC3 of FIG. 3A, the detecting cells SC0 to SC3 have predetermined position coordinates as (X0,Y0)= (0, 0), (X1, Y1)=r(sin 0°, cos 0°), (X2, Y2)=r(sin 240°, cos 240°) and (X3, Y3)=r(sin 120°, cos 120°), wherein "r" is a constant number. It is appreciated that the predetermined position coordinates of the detecting cells SC0 to SC3 are determined according to the arrangement of the detecting cells SC0 to SC3 and previously saved in a memory unit (not shown) or in the processing unit 14, and are not limited to those shown in FIG. 4.

The processing unit 14 is configured to calculate a touch position corresponding to the touch surface 120 in every detection interval (or scan interval) according to the capacitance variation signals and the predetermined position coordinates corresponding to the detecting cells SC0 to SC3 (illustrated with an example hereinafter), and to enter a relative motion mode, an absolute coordinate mode, a resting mode or a click mode according to the touch position. For example, the processing unit 14 determines a first area A1 and a second area A2 of a curved touch surface 120, and enters the relative motion mode (or mouse mode) when a touch position is identified to be within the first area A1 and enters the absolute coordinate mode (or joystick mode) when the touch position is identified to be within the second area A2. In one embodiment, the first area A1 is inside of the second area A2. For example, when only two mode areas are implemented. the mode areas A1 and A3 shown in FIGS. 2A-2C are belonging to said first area A1.

In some embodiments, in the relative motion mode (or mouse mode) the processing unit 14 calculates a displacement according to two touch positions. More specifically, said two touch positions are two positions respectively detected in two continuous or discontinuous detection intervals by the processing unit 14, wherein said displacement is served as, for example, a cursor displacement to correspondingly control a cursor motion.

In some embodiments, in the absolute coordinate mode (or joystick mode), the processing unit 14 determines a moving direction according to a current touch position. More specifically, said touch position is determined according to one position detected in a single detection interval by the processing unit 14, wherein said moving direction is served as, for example, a cursor moving direction and each moving direction is preset to correspond to one touch position in the absolute coordinate mode area. In addition, the processing unit 14 continuously outputs displacement with a fixed moving speed in the moving direction as long as the processing unit 14 continuously detects a conductor inside the second area A2 in every detection interval. The capacitive finger navigation device 1 further includes a wired or wireless transmission interface configured to output displacement information, e.g. outputting to a host.

In some embodiments, in two continuous detection intervals the user may operate in the first area A1 in an early detection interval and then move to the second area A2 in a later detection interval. Accordingly, when the processing unit 14 identifies that the touch position moves from the first area A1 to the second area A2, the processing unit 14 leaves the relative motion mode and enters the absolute coordinate mode. In one embodiment, the processing unit 14 uses a last detected displacement detected in the relative motion mode (e.g. the touch position in the first area A1) as a moving speed in the absolute coordinate mode (e.g. the touch position in the second area A2), and determines a moving direction of the moving speed according to a current touch position in the absolute coordinate mode.

In the capacitive finger navigation device 1 according to some embodiments of the present disclosure, in the absolute coordinate mode the processing unit 14 determines a moving direction according to the touch position corresponding to the touch surface 120 and outputs a predetermined moving speed. In other embodiments, when the processing unit 14 detects the mode change from the relative motion mode to the absolute coordinate mode, said moving speed is determined according to the displacement detected before the mode change occurs.

In some embodiment, the processing unit 14 further changes regions of the first area A1 and the second area A2 according to a first detected touch position being detected so as to increase the operation convenience, wherein said first detected touch position is, for example, a first touch position detected after the startup of the capacitive finger navigation device 1, a first touch position detected after the sleep mode ends, a first touch position detected after a touch event is not detected for a predetermined time interval.

As the capacitive finger navigation device 1 according to the embodiment of the present disclosure has a small size, other area(s) may be touched when the user is desired to touch one of different mode areas. Accordingly, in one embodiment when identifying that said first detected touch position is at a connection region of the first area A1 and the second area A2, the processing unit 14 selects to enter the joystick mode, i.e. the second area A2 is increased compared to the predetermined one. In other embodiments, the processing unit 14 selects to enter the mouse mode.

In other embodiments, when identifying that said first detected touch position is in the first area A1, the processing unit 14 increases the first area A1. In this manner, the movable range of the finger is increased.

In other embodiments, the processing unit 14 enters a non-output mode or a click mode when the touch position is in a central area of the touch surface 120 (e.g. third area A3), wherein said non-output mode refers to that the capacitive finger navigation device 1 does not calculate or output the relative displacement or absolute coordinate, and said click mode refers to that the capacitive finger navigation device 1 performs the operations corresponding to the single-click, double-click or multiple-click when a conductor is detected to successively contact the third area A3 several times within a predetermined time interval.

Figure 5:
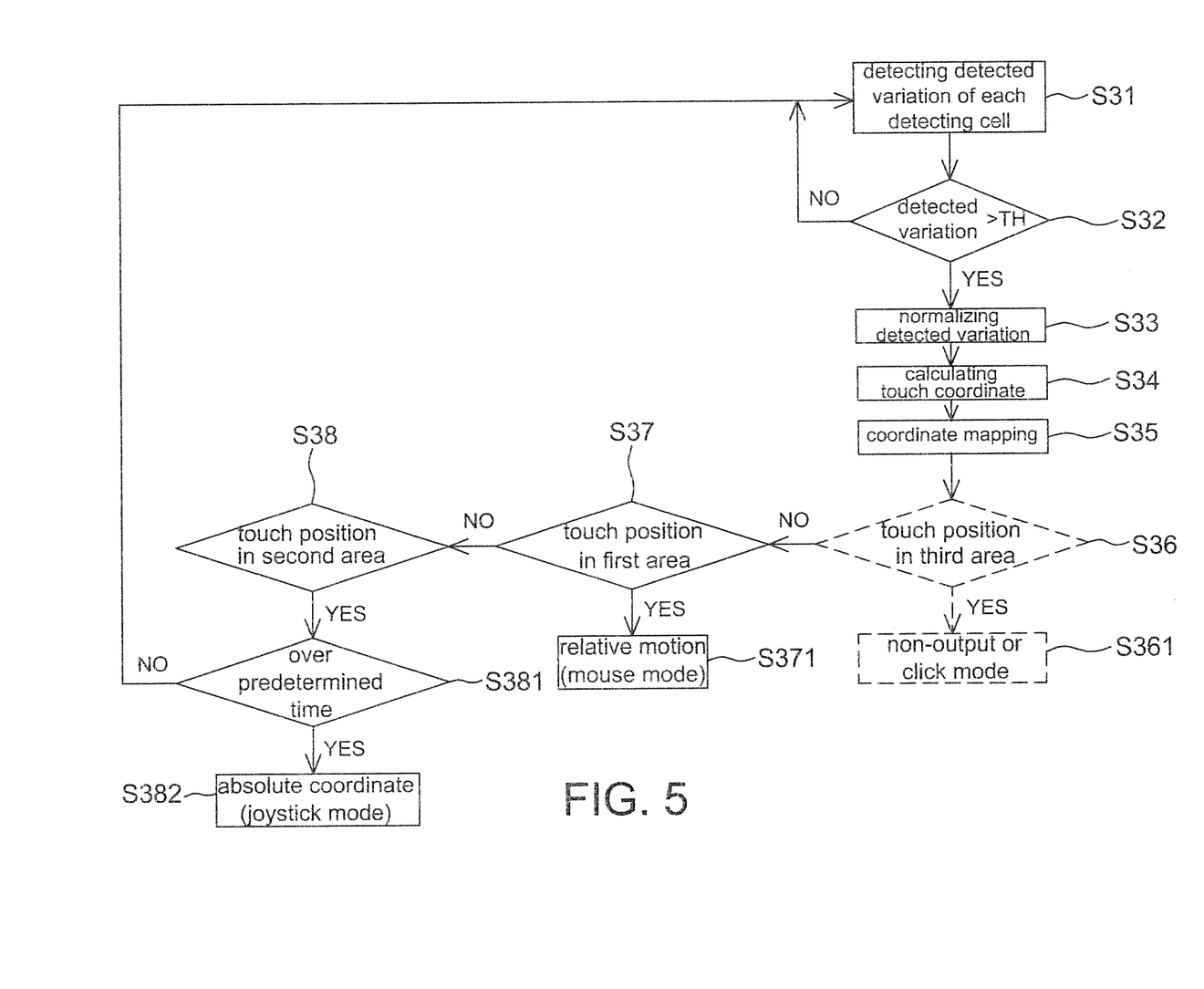
FIG. 5 is a flow chart of the operating method of the capacitive finger navigation device according to one embodiment of the present disclosure.

Referring to FIG. 5, it is a flow chart of the operating method of the finger navigation device according to one embodiment of the present disclosure, which includes the steps of: detecting a detected variation of each detecting cell (Step S31); comparing the detected variation with a threshold TH (Step S32); returning to the Step S31 when one of the detected variations is smaller than the threshold TH, and entering the Step S33 when the detected variations exceed the threshold TH; normalizing the detected variations (Step S33); calculating a touch coordinate (Step S34); performing the coordinate mapping to obtain a touch position (Step S35); entering a non-output mode or a click mode when the touch position is in a third area (Steps S36 to S361); entering a relative motion mode when the touch position is in a first area (Steps S37 to S371); and entering an absolute coordinate mode when the touch position is in a second area (Steps S38 to S382).

Referring to FIGS. 4-5 together, one example of the operating method of this embodiment is described below.

As shown in FIG. 4, in one embodiment the finger navigation device 1 includes 4 detecting cells SC0 to SC3, wherein each of the detecting cells SC0 to SC3 includes at least one driving line and at least one sensing line, as shown in FIG. 3B for example. In this embodiment, the processing unit 14 is configured to calculate a touch coordinate according to detected variations generated by every detecting cell SC0 to SC3 within each detection interval and the associated predetermined position coordinates, wherein said detected variation is the voltage variation or current variation (Step S31).

In order to increase the operating accuracy, it is able to optionally identify whether the detected variation of each of the detecting cells SC0 to SC3 exceeds a threshold TH at first. When the detected variations of all the detecting cells SC0 to SC3 exceed the threshold TH, it means that there is indeed a conductor in contact with the touch surface 120 and the processing unit 14 then calculates a touch coordinate according to a predetermined position coordination of each of the detecting cells SC0 to SC3 (as shown in FIG. 4 for example) and the associated detected variation (Step S32). Otherwise, the process returns to the Step S31 to detect again.

In some embodiments the processing unit 14 performs the finger positioning according to the following steps and performs the relative control corresponding to functions of different mode areas, e.g. mode areas A1 to A3 shown in FIGS. 2A-2C.

The processing unit 14 normalizes the detected variations of each of the detecting cells SC0 to SC3 so as to remove the interference from environmental change, i.e. calculating the touch coordinate according to normalized detected variations. For example, it is assumed that the capacitance variation signals outputted by the detecting units SC0 to SC3 are ISC0 to ISC3 respectively, which are voltage signals or current signals. Next, the maximum detectable variations MISC0 to MISC3 of each of the detecting cells SC0 to SC3 are used in the equation $$NISCi = ISCi \times 100 / MISCi, \; i = 0 \text{ to } 3$$

to normalize the capacitance variation signals so as to obtain normalized capacitance variation signals NISC0 to NISC3 (Step S33), wherein said maximum detectable variations MISC0 to MISC3 are predetermined values and updated according to actual operating results so as to overcome the change of the environment and system parameters, or said maximum detectable variations MISC0 to MISC3 are actually detected results in a setup procedure. The number of "i" is determined according to a number of the detecting cells SC0 to SC3.

Next, in Step S34 the processing unit 14 calculates a touch position according to the normalized capacitance variation signals NISC0 to NISC3. Herein, it is assumed that a predetermined position coordinate of the detecting cell SC0 is (X0, Y0), a predetermined position coordinate of the detecting cell SC1 is (X1, Y1), a predetermined position coordinate of the detecting cell SC2 is (X2, Y2) and a predetermined position coordinate of the detecting cell SC3 is (X3, Y3). In one embodiment, equations below are used to calculate the touch coordinate (Cx,Cy) in one detection interval (or scan interval)

$$Cx = (NISC0 \times X0 + NISC1 \times X1 + NISC2 \times X2 + NISC3 \times X3) / (NISC0 + NISC1 + NISC2 + NISC3)$$

$$Cy = (NISC0 \times Y0 + NISC1 \times Y1 + NISC2 \times Y2 + NISC3 \times Y3) / (NISC0 + NISC1 + NISC2 + NISC3)$$

In some embodiments, in calculating (Cx,Cy) the original point (X0, Y0) is not used. In some embodiments, the touch coordinate (Cx,Cy) is a relative distance from the original point (X0,Y0), i.e. (Dx,Dy)=(Cx,Cy)−(X0,Y0), wherein the original point may not be (0,0). In addition, the predetermined position coordinates of the detecting cells SC0 to SC3 are not limited to those shown in FIG. 4 and are determined according to the arrangement of the detecting cells.

In the Step S34, the touch coordinate (Cx,Cy) is obtained according to three vertices (or four points if the center is included) of a triangle, and when the touch surface 120 has a circular shape, the processing unit 14 maps the touch coordinate (Cx,Cy) to a touch position associated with the touch surface 120, e.g. mapping every point within the triangular range of FIG. 4 to a circular range, i.e. the range of the touch surface 120 (Step S35). It should be mentioned that, although herein the description takes the mapping from triangle to circle as an example, the present disclosure is not limited thereto. In other embodiments, the mapping may be from the rectangular coordinate to the circular coordinate according to the arrangement of the detecting cells. In addition, the touch surface 120 is not limited to be a circle but determined according to different applications without particular limitation. It is appreciated that the coordinate mapping between different coordinate shapes is only the mathematical calculation and thus details thereof are not described herein.

Finally, the processing unit 14 identifies the mapped touch position according to the function areas, e.g. mode areas A1 to A3, previously saved therein or in a memory unit so as to perform the corresponding operation. For example, when the mapped touch position is within the third area A3, the processing unit 14 does not perform any control or enter a click mode (Steps S36 to S361); when the mapped touch position is within the first area A1, the processing unit 14 enters a relative motion mode, e.g. outputting cursor displacement information according to the variation between mapped touch positions (e.g. two touch positions); and when the mapped touch position is within the second area A2, the processing unit 14 enters an absolute coordinate mode, e.g. determining a moving direction according to a current touch position and takes the moving direction and a fixed moving speed as the cursor displacement information.

In other embodiments, when identifying that a touch position is in the second area A2, the processing unit 14 does not output the displacement information immediately but starts to output the displacement information after a predetermined number of touch positions are continuously detected in the second area A2 (i.e. for a predetermined time interval) so as to increase the operating accuracy. For example, the displacement information is outputted to a host (not shown) for controlling a cursor motion correspondingly.

It is appreciated that the above mode areas A1 to A3 are only intended to illustrate but not to limit the present disclosure. For example, in some embodiments FIG. 5 does not include the Steps S36 to S361.

Figure 6:
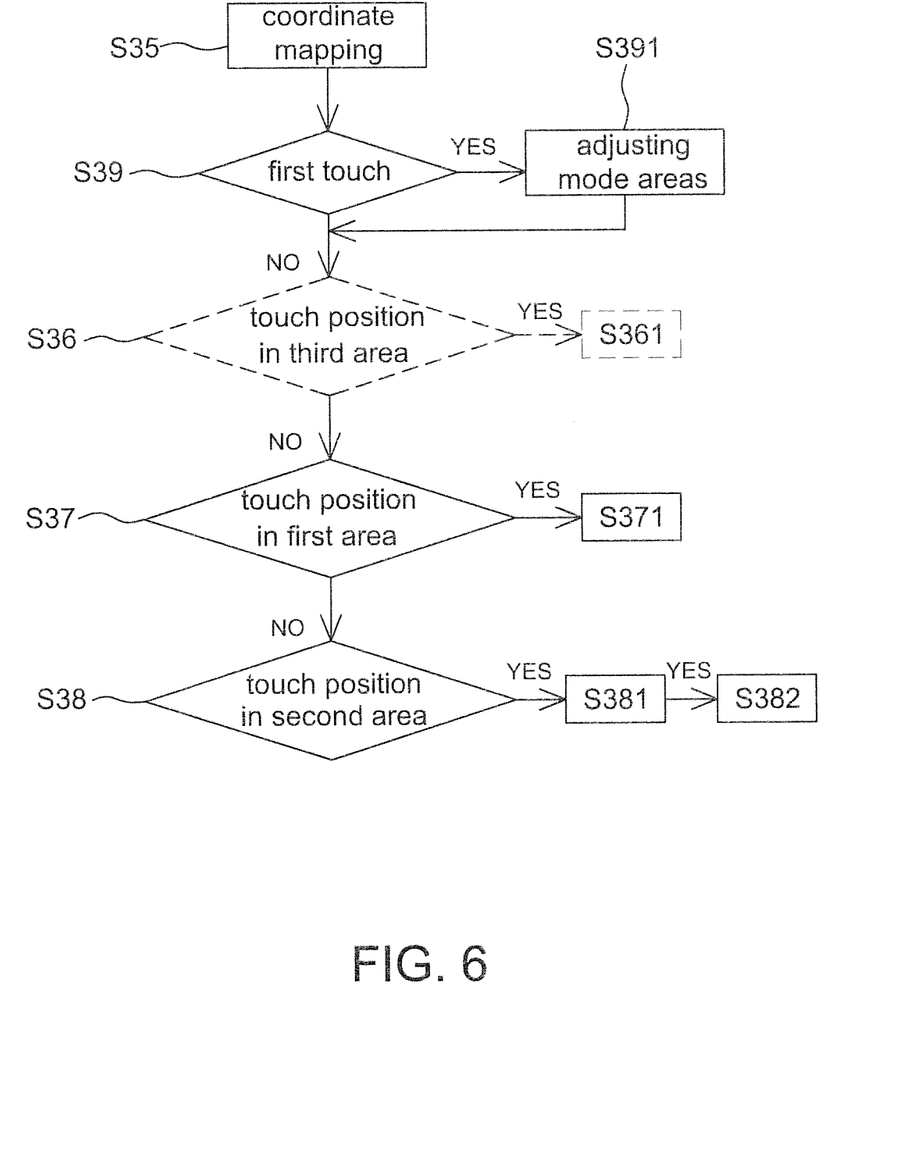
FIG. 6 is a partial flow chart of the operating method of the capacitive finger navigation device according to another embodiment of the present disclosure.

Referring to FIG. 6, it is a schematic diagram of the partial flow chart of the operating method of the finger navigation device according to another embodiment of the present disclosure. The difference between FIG. 6 and FIG. 5 is that in FIG. 6 a step of identifying whether a touch is a first touch (Step S39) is further included between the Steps S35 and S36, and other steps not shown are identical to those in FIG. 5, wherein the definition of said first touch (e.g. first detected touch position) is described above and thus details thereof are not repeated herein. In this embodiment, when the processing unit 14 identifies that a touch event is a first touch, the range of the mode areas is adjusted (Step S391) so as to increase the practicality and convenience of operating.

In some embodiments, when the processing unit 14 identifies said first detected touch position is at a connection region of the first area A1 and the second area A2, the second area A2 is increased and the first area A1 is decreased, i.e. directly determining that the touch position is in the second area A2. In other embodiments, when the processing unit 14 identifies that said first detected touch position is in the first area A1, the first area A1 is increased and the second area A2 is decreased. In some embodiments of the present disclosure, two mode areas (e.g. A1 and A2) are taken as an example to illustrate. In addition, in FIG. 6 although the Steps S39 to S391 are shown to be between the Steps S35 and S36 of FIG. 5, the present disclosure is not limited thereto. In other embodiments, the Steps S39 to S391 are at other positions between the Steps S32 and S35 without particular limitation.

As mentioned above, the processing unit 14 identifies whether the mode change occurs according to touch positions obtained in two detection intervals (or scan intervals). For example, when two successive touch positions indicate the change from the first area A1 to the second area A2, the processing unit 14 determines a moving speed of the absolute coordinate mode according to the relative motion mode and determines a moving direction of the moving speed according to the absolute coordinate mode, wherein this step may be between the Steps S35 and S36 in FIG. 5.

It should be mentioned that in the above embodiments the mouse mode is shown to be the inner part of the touch surface 120 and the joystick mode is shown to be the outer part of the touch surface 120, but the present disclosure is not limited thereto. In addition, the displacement obtained by the capacitive finger navigation device 1 is not limited to be used to control the cursor motion, and may also be used to move displayed object or icon or served as other operating parameters depending on the application thereof.

It should be mentioned that although the present disclosure is described using the mutual capacitive navigation device, the present disclosure is not limited thereto. The present disclosure is also adaptable to the self-capacitive navigation device, wherein detection methods of the self-capacitive type are well known and thus details thereof are not described herein.

As mentioned above, the computer peripheral devices need to be developed with the popularity of the portable devices so as to be adapted to various electronic devices. Therefore, the present disclosure further provides a capacitive finger navigation device (FIG. 1) and operating method thereof (FIGS. 5 and 6) that operate in a mouse mode or a joystick mode according to different touch positions so as to realize functions of at least two peripheral devices together by using a single navigation device. In addition, according to different applications, the capacitive finger navigation device according to the embodiment of the present disclosure further includes a resting mode and/or a click mode so as to further increase the practicability thereof.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A finger navigation device, comprising:
   a capacitive touch device comprising:
      a touch surface configured as an operating interface; and
      a plurality of detecting cells configured to respectively output a capacitance variation signal; and a processing unit configured to calculate a touch position corresponding to the touch surface according to the capacitance variation signals and predetermined position coordinates of the detecting cells to accordingly enter a relative motion mode or an absolute coordinate mode, wherein the relative motion mode corresponds to a first area of the touch surface and the absolute coordinate mode corresponds to a second area of the touch surface, and the processing unit is further configured to adjust both of the first area and the second area according to a first detected touch position, wherein when the first area is increased, the second area is decreased correspondingly, and when the first area is decreased, the second area is increased correspondingly.

2. The finger navigation device as claimed in claim 1, wherein the first area is inside of the second area.

3. The finger navigation device as claimed in claim 1, wherein the processing unit is further configured to enter a non-output mode or a click mode when the touch position is in a central area of the touch surface.

4. The finger navigation device as claimed in claim 1, wherein the touch surface is a dome shape or a concave shape.

5. The finger navigation device as claimed in claim 1, wherein in the relative motion mode the processing unit is configured to calculate a displacement according to two touch positions, and in the absolute coordinate mode the processing unit is configured to determine a moving direction according to a current touch position and output a predetermined speed without determining a moving speed associated with the moving direction according to the current touch position.

6. The finger navigation device as claimed in claim 1, wherein when entering the absolute coordinate mode from the relative motion mode, the processing unit is configured to use a last detected displacement in the relative motion mode as a moving speed in the absolute coordinate mode, and to determine a moving direction of the moving speed according to a current touch position in the absolute coordinate mode.

7. The finger navigation device as claimed in claim 1, wherein an increased area of the first area is a decreased area of the second area, and a decreased area of the first area is an increased area of the second area.

8. An operating method of a finger navigation device, the finger navigation device comprising a touch surface and a plurality of detecting cells, the operating method comprising:

calculating a touch coordinate according to a predetermined position coordinate and associated detected variation of each of the detecting cells when the detected variations of the detecting cells exceed a threshold;

mapping the touch coordinate to a touch position associated with the touch surface;

entering a relative motion mode when the touch position is in a first area;

entering an absolute coordinate mode when the touch position is in a second area, and increasing the second area and correspondingly decreasing the first area according to a first detected touch position, or increasing the first area and correspondingly decreasing the second area according to the first detected touch position.

9. The operating method as claimed in claim 8, further comprising:

normalizing the detected variations, wherein the touch coordinate is calculated according to normalized detected variations.

10. The operating method as claimed in claim 8, wherein in the relative motion mode, the operating method further comprises:

calculating a displacement according to two touch positions.

11. The operating method as claimed in claim 8, wherein in the absolute coordinate mode, the operating method further comprises:

determining a moving direction according to a current touch position.

12. The operating method as claimed in claim 8, further comprising:

entering a non-output mode or a click mode when the touch position is in a third area.

13. The operating method as claimed in claim 8, further comprising:

increasing the second area and decreasing the first area when the first detected touch position is at a connection region of the first area and the second area.

14. The operating method as claimed in claim 8, further comprising:

increasing the first area and decreasing the second area when the first detected touch position is in the first area.

15. The operating method as claimed in claim 8, further comprising:

determining a moving speed of the absolute coordinate mode according to the relative motion mode when two successive touch positions change from the first area to the second area, and determining a moving direction of the moving speed according to the absolute coordinate mode.

16. A capacitive navigation device, comprising:

a curved touch surface configured as an operating interface; and a processing unit configured to determine a first area and a second area corresponding to the curved touch surface, enter a mouse mode when identifying a touch position in the first area and enter a joystick mode when identifying the touch position in the second area, and increase the first area and correspondingly decrease the second area according to a first detected touch position.

17. The capacitive navigation device as claimed in claim 16, wherein in the mouse mode the processing unit is configured to calculate a cursor displacement according to two touch positions detected in two detection intervals respectively, and in the joystick mode, the processing unit is configured to determine a cursor moving direction according to one touch position detected in one detection interval.

18. The capacitive navigation device as claimed in claim 16, wherein the processing unit is further configured to identify a central area of the curved touch surface as a third area, and enter a non-output mode or a click mode when identifying the touch position is in the third area.

19. The capacitive navigation device as claimed in claim 16, wherein when the processing unit identifies the first detected touch position is in the first area, the first area is increased and the second area is decreased.

20. The capacitive navigation device as claimed in claim 16, wherein when the processing unit identifies the first detected touch position is at a connection region of the first area and the second area, the joystick mode is entered.

21. The capacitive navigation device as claimed in claim 16, wherein when identifying the touch position changes from the first area to the second area, the processing unit is configured to use a last detected displacement when the touch position is in the first area as a moving speed when the touch position is in the second area.

* * * * *